Dec. 14, 1943.   L. W. YOUNG   2,336,581
TEMPLET-TRACING APPARATUS
Filed Aug. 15, 1941   2 Sheets-Sheet 1
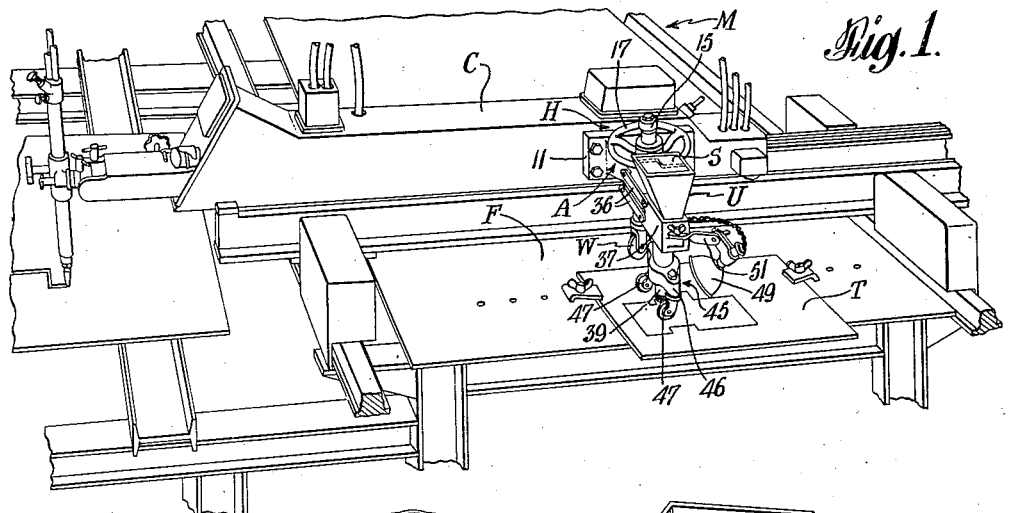
Fig. 1.
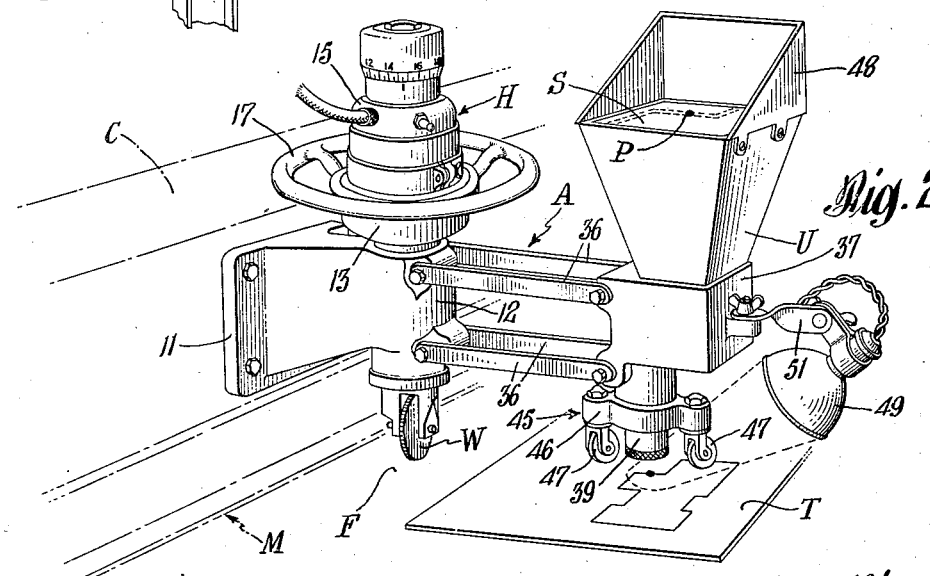
Fig. 2.
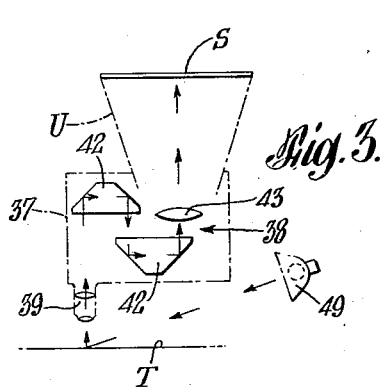
Fig. 3.
Fig. 4.
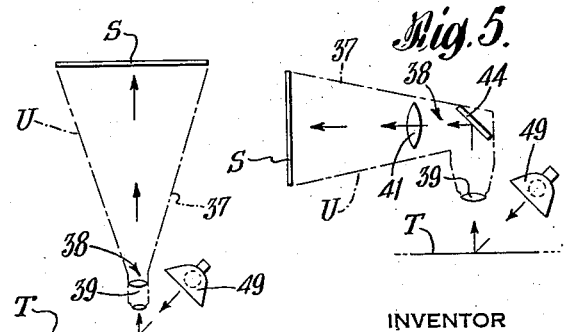
Fig. 5.
INVENTOR
LLOYD W. YOUNG
BY
ATTORNEY

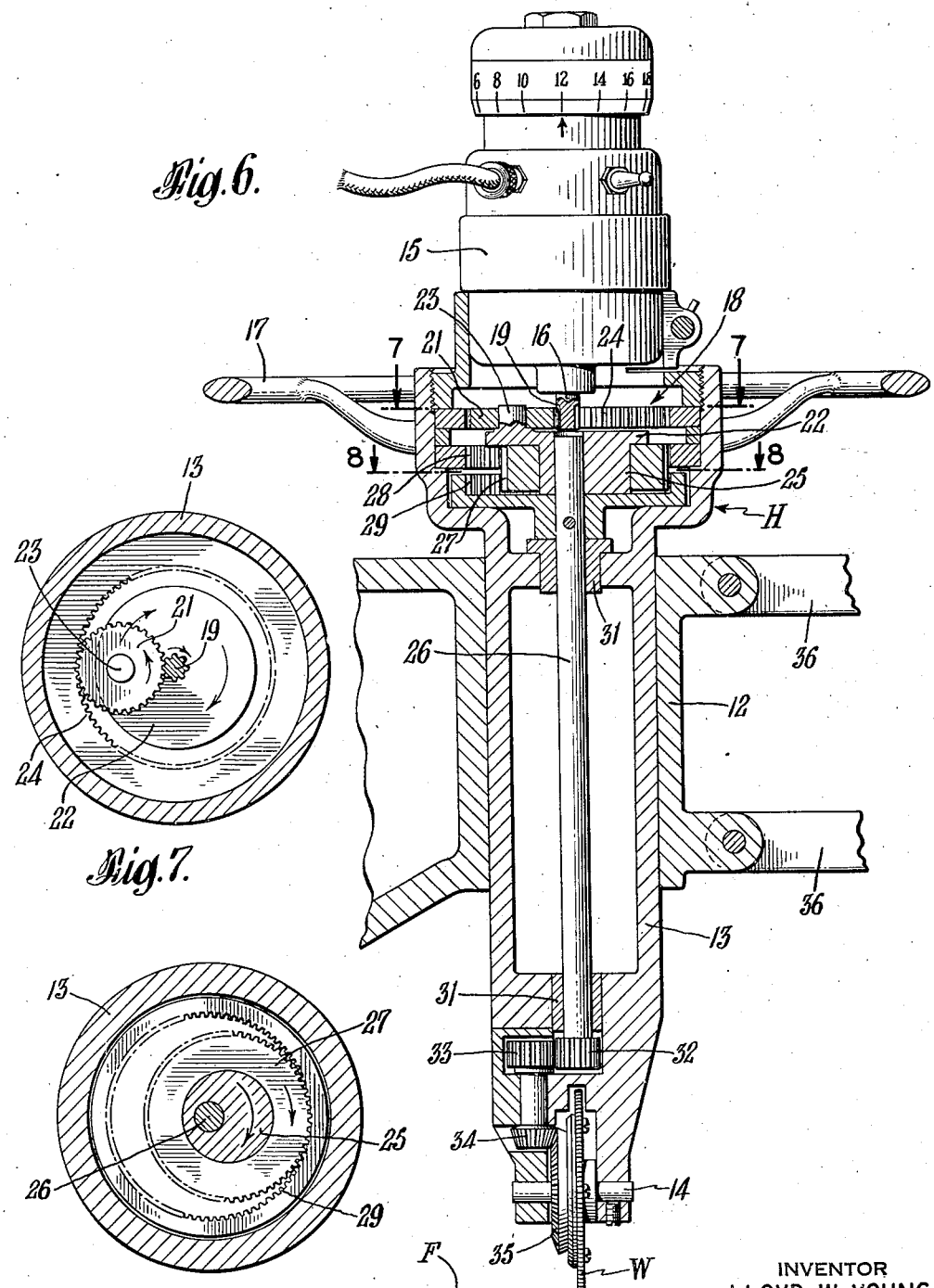

Patented Dec. 14, 1943

2,336,581

UNITED STATES PATENT OFFICE 2,336,581

TEMPLET-TRACING APPARATUS

Lloyd W. Young, Scotch Plains, N. J., assignor to Union Carbide and Carbon Corporation, a corporation of New York Application August 15, 1941, Serial No. 406,949

7 Claims. (Cl. 33—23)

This invention relates to templet tracing apparatus and more especially to improved hand-guided traction units for use on shape-cutting machines, and the like.

It is customary to support a blowpipe or similar tool upon a carriage movable freely in varying directions in a plane, and to guide the tool relatively to a workpiece about a course defined by a templet drawing. Heretofore, it has been customary to propel the carriage by means of a knurled traction wheel in rolling engagement with a paper or cloth templet mounted on a horizontal supporting surface, and to guide the traction wheel manually about the contour line inscribed on the templet, thereby to produce motion of the tool about a similar path relative to the workpiece. The operator customarily has manipulated a steering device to keep the traction wheel in fixed relation to the templet line, for example, by pivoting the tracing head so as to maintain the traction wheel rolling directly along the line, or at a fixed lateral distance from the line. In the latter case, the proper position for the traction head may be determined by a transversely spaced pointer maintained over the line by the operator.

Tracing operations of the foregoing type often present difficulties, in that the tracing line is at least partly obscured by the traction wheel or the pointer. Furthermore, parallax and personal error make it extremely difficult for the operator to maintain the proper relationship between the tracing element and the line. Where precision cutting is required these sources of error are often of sufficient magnitude as to preclude manual steering of the tool, and resort must be made to expensive mechanical templets, and automatic templet-following mechanism.

The present invention has for its aim to substantially eliminate the personal error which ordinarily accompanies hand-guided operations. The principal objects of the present invention are: to provide an improved templet tracing apparatus; to provide in such an apparatus optical means for assisting the operator in directing the course of the tool-supporting carriage; to provide in such an apparatus an improved type of tracing head; to provide a traction head adapted to engage a supporting surface at a point remote from the templet, and spaced from an optical tracing guide; to provide an improved traction unit wherein the motor and drive mechanism are concentrically arranged; to provide an optical tracing device adapted to form an image of a portion of the templet line upon a screen; and to provide an improved optical guiding device wherein an enlarged erect image of an illuminated portion of the templet line is formed on a screen readily visible to the operator of the traction unit. These and other objects will become more readily apparent from the accompanying drawings, disclosing several embodiments of the invention, and from the following specification.

In the drawings,

Fig. 1 is a perspective view of an improved templet-tracing apparatus shown attached to the upper carriage of a shape-cutting machine;

Fig. 2 is a perspective view showing the tracing apparatus in greater detail;

Figs. 3, 4, and 5 are diagrammatic views of typical optical systems which may be employed with the apparatus;

Fig. 6 is a vertical cross-sectional view through the traction head, with the motor shown in elevation; and, Figs. 7 and 8 are cross-sectional views taken on the lines 7—7 and 8—8 respectively of Fig. 6.

Generally speaking, the invention comprises a templet-tracing apparatus A adapted to be mounted on a tool-supporting carriage of a shape-cutting or similar machine M. The apparatus A is composed of a traction head H and an optical guiding unit or contour line viewer U. The optical unit U is adapted to be moved over successive portions of a templet T by the head H, and forms an image of an illuminated portion of the templet line so as to be viewed by the operator, for example, upon a screen S, having a tracing point or index mark P thereon. A traction wheel W journalled to the head H engages a traction surface F to move the carriage C in a direction determined by the position of the wheel about the axis of the traction head H.

More specifically, the apparatus A is adapted for mounting upon any form of tool-supporting carriage movable in a horizontal plane. Typical of such carriages are those intended to support a blowpipe for movement in varying directions in a horizontal plane, e. g., link-supported mechanisms pivotal about a vertical axis, or compound-motion carriages supported for movement along coordinate axes in a horizontal plane, of the type shown in Fig. 1 and more fully disclosed in patent application Serial No. 161,085 filed August 26, 1937, now Patent No. 2,279,338.

The apparatus A is bolted or otherwise secured at one end to the carriage C by means of a bracket 11, having a sleeve 12 at its opposite end for slidably and pivotally receiving the generally cylindrical tubular housing 13 of the traction head H. The traction wheel W, journalled on a spindle 14 at a lower portion of the housing 13, supports the head on the traction surface. A motor 15 is mounted at the top of and in concentric relation to the tubular housing 13. Accordingly, the armature shaft 16 of the motor 15 is aligned with the axis of the head H, and all parts of the head are substantially balanced about the axis. The handwheel 17, concentrically secured at the upper portion of the housing 13, provides means for rotating the head and thereby changing the direction of travel of the wheel W.

Transmission mechanism 18 comprises a motor pinion 19 which meshes with a planet pinion 21, as shown in Figs. 6 and 7. A wabble plate 22, freely rotatable on a central transmission shaft 26, is provided with an eccentric journal 23 for supporting the planet pinion 21 as the latter revolves in an orbit in operative engagement with the pinion 19 and a fixed internal gear 24. The wabble plate 22 also is provided with an eccentric shank 25 to which a wabble gear 27 is mounted. A pair of internal gears 28 and 29, secured to the housing 13 and to the shaft 26, respectively, engage the wabble gear 27, as shown in Figs. 6 and 8. Although the internal gears 28 and 29 are of substantially the same size, one of the gears contains at least one more tooth than the other, so that as the wabble gear 27 revolves, the internal gears 28 and 29 move slowly relatively to one another, thereby producing a large step-down ratio in the speed transmission between the wabbler plate 22 and the shaft 26. With the planetary gear system disclosed in Fig. 6, a speed reduction of several hundred or more is easily possible, depending upon the gear selection.

The central transmission shaft 26 is journalled within bushings 31 located at spaced portions along the axis of the head H. The shaft 26 connects at its lower end with the traction wheel W through spur pinions 32 and 33 and through bevel pinion 34 and bevel gear 35, to which latter the traction wheel is attached.

The operation of the traction head H may be summarized as follows: With the wheel W resting on a suitable traction surface F, and with the motor speed properly adjusted, the current to the motor is turned on and the rotary motion of the shaft 16 is transmitted to the wheel W to rotate the wheel at relatively low speed. The direction of the traction wheel travel is varied as the housing 13 swivels within the sleeve 12 in response to motion imparted to the handwheel 17. By mounting the motor 15 concentrically on the head in the manner shown, the head is maintained substantially in dynamic balance, so that no lateral forces are created tending to move the carriage when the handwheel 17 is pivoted. Furthermore, by locating the motor 15 in a central position the moment of inertia of the head H is reduced to a minimum thus providing easy manipulation, and the operator's view of the templet and surrounding parts remains substantially unobstructed. The location of the motor 15 additionally centralizes the weight of the head H and encourages smooth sliding action between the housing 13 and the sleeve 12 in response to undulations in the traction surface.

The optional guiding unit or viewer U, which comprises essentially an image-forming-and-viewing mechanism, preferably is secured in spaced relation to the head H for free riding movement over and along the templet T. As shown in Fig. 2, the unit U is spaced from the head H by a parallel bar linkage 36 pivotally connecting the sleeve 12 with a casing 37 forming a light-tight enclosure for the unit U. The casing 37 extends upwardly, as shown in Fig. 2, to receive an image viewer, such as ocular lenses, or a relatively large horizontal screen S of ground glass or other translucent material. Projection apparatus 38 capable of forming an image on the screen S of the successive illuminated portions of the contour line being traced is provided within the casing 37. Any conventional arrangement of lenses, mirrors, or the like, may be employed for this purpose. Preferably, however, use is made of an objective or templet-tracing lens 39 located in close relation to the templet surface so as to form an image of a portion of the contour line. This image may be formed to an enlarged scale directly upon the screen S, as shown in Fig. 4, in which case the image is real and inverted. If the inverted image should be disconcerting to the operator, the difficulty may be readily overcome by employing an erecting lens or lenses 41, as shown in Fig. 5, or by using properly oriented erecting prisms 42, diagrammatically shown in Fig. 3, with or without the use of an ocular lens 43. The operator steers the objective 39 along the templet by manually controlling the handwheel 17, the movement being so regulated as to maintain the image of the successively traced portions aligned with the tracing point P located on the screen S.

An optional arrangement is disclosed in Fig. 5 wherein use is made of a reflector 44, preferably comprising a first-surface mirror disposed at a 45° angle to the vertical so as to form an image on the screen S while the latter is disposed in a vertical plane. Such an arrangement allows the operator to control the traction head from a remote point, for example, at a point adjacent to the blowpipe, as shown in Patent No. 2,279,338, while viewing the image on the screen S from a substantial distance.

The objective lens 39 is maintained at a constant distance above the templet T, to maintain the image in focus at all times, by the use of a templet-riding device 45 of any convenient type. As shown in Fig. 2, the device 45 may comprise a bracket 46 to which the pintles of one or more casters 47 are pivotally mounted. The casters 47 swivel as the direction of motion imparted by the traction head varies, so that the casters roll freely at all times over the templet T. Since the knurled traction wheel engages the traction surface at a point separated from the templet T, or at least at a point separated from the contour lines formed on the templet, the useful life of the templets is greatly increased.

A shield 48 may be provided adjacent to the screen S, as shown in Fig. 2, in order to render the image more clearly visible. Unless the apparatus is used in a brightly illuminated room and the screen S carefully shielded, additional illumination may be required. A lamp 49, adjustably attached to the casing 37 as by means of a bracket arm 51, may be provided for this purpose so as to direct a beam against the portion of the templet T viewed by the objective 39.

The spacing between the head H and unit U is not critical and may be varied to suit individual requirements. This spacing, if sufficient, may allow the wheel W to direct the carriage about the entire course without the wheel at any time contacting the templet T. It is immaterial whether the head H or the unit U is nearest to the carriage, as the device works equally well when the head H is remote from the carriage. Where the traction surface which supports the templet T is smooth and plane, the parallel bar linkage 36 and the casters 47 may be unnecessary, and the casing 37 may be secured rigidly to the sleeve 12. Otherwise, slight undulations in the templet-supporting surface may alter the optical relationship between the templet T and the projection apparatus, necessitating a templet riding device to keep the image sharply defined at all times.

Various other modifications of the herein disclosed invention may be made without departing from the principles thereof or sacrificing its advantages.

I claim:

1. Blowpipe apparatus comprising a blowpipe-supporting carriage movable in varying directions in a plane; a carriage-propelling head secured to said carriage; manually operable steering means adapted to control the direction of carriage movement; and an optical steering guide adapted to form an enlarged image of an illuminated portion of a contour line drawn on a templet supported in spaced relation to said head, said guide comprising a screen mounted on said carriage parallel to said plane and in a position adjacent to the operator of said steering means, and a contour line tracer comprising projection mechanism extending closely adjacent to said illuminated portion of said line for movement along said line, and adapted to form a real and enlarged image of said portion on said screen.

2. Blowpipe apparatus comprising a blowpipe-supporting carriage movable in varying directions in a horizontal plane; and traction head having a cylindrical casing vertically slidable on said carriage, said head having at its lower end a traction wheel engageable with a traction surface under the weight of said head for propelling said carriage, manually-operable steering means adapted to pivot said head about the vertical axis of said casing to control the direction of movement of said carriage, and a traction-wheel driving motor extending vertically above said head, said motor and steering means being concentrically disposed relative to said casing to promote free sliding motion of said casing relative to said carriage.

3. A templet-tracing apparatus comprising a blow-pipe-supporting carriage movable in varying directions in a horizontal plane; a traction head vertically slidable on said carriage, said head having a traction wheel for supporting said slidable head and being engageable with a horizontal traction surface for propelling said carriage about a course having the size and shape of a horizontally disposed templet contour, a manually-operable steering wheel adjacent to said head adapted to pivot said wheel about a vertical axis to control the direction of movement of said carriage, and a traction-wheel driving motor extending in vertical alignment with the axis of said head; and a steering guide movable with said head and having a horizontal screen adjacent to said handwheel, and a projection system adapted to form an image on said screen of an illuminated portion of a templet lying against said traction surface.

4. Shape-cutting machine carriage-propelling apparatus, comprising a traction head having a traction wheel adapted to engage a horizontal supporting surface, and steering means adapted to pivot said wheel about a vertical axis along a course having the size and shape of a templet contour; and a steering guide secured to and movable vertically relative to said head for indicating the direction of movement of said head, said guide comprising optical means adapted to follow said contour at a fixed distance above the successive portions thereof and to form an enlarged image of an illuminated portion of said contour, said image being projected on a screen visible to the operator of said steering means.

5. Shape-cutting machine carriage-propelling apparatus comprising a traction head having a traction wheel adapted to engage a horizontal supporting surface, and steering means adapted to pivot said wheel about a vertical axis in accordance with a templet contour; a steering guide located in spaced relation to and movable with said head along such templet supported on said surface at a point separated from the point of engagement of said traction wheel, said guide comprising a screen, a lamp attached to said guide and adapted as said guide moves along said templet to illuminate successive portions of said templet, a lens system adapted to form an image of an illuminated portion of said templet on said screen, means connected to said carriage and enclosing said lens system and screen and exposing said screen to the view of the operator and a templet-riding device adapted to support said guide at a fixed distance above said templet as said guide moves over said templet.

6. Apparatus comprising a carriage movable in varying directions in a horizontal plane; a manually-guided traction head adapted to propel said carriage about a course defined by a contour line; optical means comprising a screen and image-forming means adapted to form a real image of a portion of said line on said screen; and a housing associated with said carriage and head and enclosing said screen and said image-forming means; said housing having an opening from said image-forming means to said contour line, and another opening through which said screen is visible to the operator guiding said traction head.

7. Apparatus comprising a carriage movable in varying directions in a plane; a manually guided traction head having a tracing wheel adapted to engage a traction surface; means for driving said tracing wheel for propelling said carriage about a course defined by a contour line on a templet surface located in spaced relation to said tracing wheel; optical means comprising image-forming means adapted to form an image of a portion of said line, and an image-viewer adjacent to the operator of said traction head; and means connected to said carriage for supporting said image-forming means and said image-viewer and constructed and arranged to expose said image to view by the operator guiding said traction head.

LLOYD W. YOUNG.